US010936334B2

(12) United States Patent
Nadella et al.

(10) Patent No.: US 10,936,334 B2
(45) Date of Patent: Mar. 2, 2021

(54) RESOURCE CONFIGURATION MIGRATION AND IMPLEMENTATION UTILIZING MULTIPLE BRANCHES

(71) Applicant: BANK OF AMERICA CORPORATION, Charlotte, NC (US)

(72) Inventors: Sailaja L. S. Nadella, Agoura Hills, CA (US); Srinivas Ankareddy, Oak Park, CA (US); Amitkumar R. Bhandari, Simi Valley, CA (US); Scott Davies Jordan, Waxhaw, NC (US); Adrian Marchis, Westlake Village, CA (US); Noah G. Sack, Sloatsburg, NY (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 314 days.

(21) Appl. No.: 16/033,653

(22) Filed: Jul. 12, 2018

(65) Prior Publication Data
US 2020/0019411 A1 Jan. 16, 2020

(51) Int. Cl.
*G06F 9/44* (2018.01)
*G06F 9/445* (2018.01)
*G06F 11/36* (2006.01)
*G06F 8/71* (2018.01)

(52) U.S. Cl.
CPC ............ *G06F 9/44505* (2013.01); *G06F 8/71* (2013.01); *G06F 11/3664* (2013.01); *G06F 11/3688* (2013.01)

(58) Field of Classification Search
CPC .... G06F 8/71; G06F 9/44505; G06F 11/3664; G06F 11/3688
See application file for complete search history.

(56) References Cited

U.S. PATENT DOCUMENTS

| 5,623,661 | A | 4/1997 | Hon |
|---|---|---|---|
| 5,903,897 | A | 5/1999 | Carrier, III et al. |
| 6,584,476 | B1 | 6/2003 | Chatterjee et al. |
| 6,631,386 | B1 | 10/2003 | Arun et al. |
| 7,099,899 | B2 | 8/2006 | Choy et al. |
| 7,251,669 | B1 | 7/2007 | Arora |

(Continued)

*Primary Examiner* — Lewis A Bullock, Jr.
*Assistant Examiner* — Tina Huynh
(74) *Attorney, Agent, or Firm* — Michael A. Springs; Moore & Van Allen PLLC; Jeffrey R. Gray

(57) ABSTRACT

The invention relates to a configuration implementation system that allows users to maintain configurations for production resources (e.g., application, systems, or the like) in a main configuration table, and multiple versions of the configurations in branch configuration tables in order to deploy and test the branch configurations independently of each other based on implementation schedules. Moreover, the configurations in the configuration branches can be implemented in various releases for the production resource as necessary and merged into the other branches in order to maintain consistency with the production resource and to identify any discrepancies between the configuration branches. The invention also utilizes script patterns to create scripts to implement the configuration changes in the production resources in a uniform way regardless of the user that is creating, modifying, deploying, testing, and/or implementing the configurations through the various branches.

19 Claims, 10 Drawing Sheets

(56) References Cited

U.S. PATENT DOCUMENTS

| | | | |
|---|---|---|---|
| 7,437,722 | B2 | 10/2008 | Poole |
| 7,617,289 | B2 | 11/2009 | Srinivasan et al. |
| 7,805,439 | B2 | 9/2010 | Elliott et al. |
| 7,836,028 | B1 | 11/2010 | Agarwal et al. |
| 8,005,792 | B2 | 8/2011 | Green et al. |
| 8,918,429 | B2 | 12/2014 | Stanev |
| 8,924,917 | B2 | 12/2014 | Fitzgerald et al. |
| 9,098,538 | B2 | 8/2015 | Bansode et al. |
| 9,135,163 | B2 | 9/2015 | Kandiraju et al. |
| 9,280,365 | B2 | 3/2016 | Jones et al. |
| 9,940,122 | B2 | 4/2018 | Carranza et al. |
| 2005/0198630 | A1 | 9/2005 | Tamma et al. |
| 2007/0239774 | A1 | 10/2007 | Bodily et al. |
| 2010/0042605 | A1 | 2/2010 | Cheng et al. |
| 2013/0268920 | A1* | 10/2013 | Ursal .................. G06F 8/70 717/131 |
| 2016/0154645 | A1* | 6/2016 | Chou ................ G06F 9/44505 717/121 |
| 2017/0277743 | A1* | 9/2017 | Jain .................... G06F 16/2336 |

\* cited by examiner

| BRANCH | CONFIG. ID | CONFIG. CATEGORY | CONFIG. TYPE | DESCRIPTION | ERROR | AUTHORITY | PRIORITY | SEVERITY LEVEL | PRODUCT SPECIFIC | ADHOC CONFIG. | ERROR LEVEL | CHANGE TYPE |
|---|---|---|---|---|---|---|---|---|---|---|---|---|
| BRANCH 1 | XXXX | XXXX | XXXXX | XXXXX XXXX | XXX | X | XXXX | XXXX | XX | XX | XXX | ADD |
| BRANCH 2 | XXXX | XXXX | XXXXX | XXXXX XXXX | XXX | X | XXXX | XXXX | XX | XX | XXX | ADD |

*FIG. 9*

RESOURCE CONFIGURATION MIGRATION AND IMPLEMENTATION UTILIZING MULTIPLE BRANCHES

FIELD

The present invention relates to application configuration change systems, and more particularly improving upon migration and implementation of configuration changes utilizing multiple branch versioning of the configuration changes for testing an implementation of the configuration changes using automated script generation.

BACKGROUND

Organizations institute systems and procedures for making resource configuration changes. Some resource configuration changes are planned months in advance, while other resource configuration changes have very short turnaround times of hours, days, or the like. It is difficult for organizations to maintain, test, and implement all of these changes simultaneously as the resource configurations are being changed on different schedules.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

Generally, systems, computer products, and methods are described herein for a configuration implementation system and/or applications therefor. The configuration implantation system and/or applications allow users to maintain configurations for production resources (e.g., application, systems, or the like) in a main configuration table, and multiple versions of the configurations in branch configuration tables in order to modify, deploy, and test the branch configurations independently of each other based on implementation schedules. Moreover, the configurations in the configuration branches can be implemented in various releases for the production resource as necessary and merged into the other branches in order to maintain consistency with the production resource and to identify any discrepancies between the configuration branches.

The present invention allows for maintaining a complex technical configuration environment with an organization release calendar, wherein various integrated releases are planned days, weeks, months, or the like in advance. Moreover, the present invention allows for implementation of the configuration changes into the production resource within a short turnaround time (e.g., days or weeks) as opposed to the months it may typically take to implement such changes. The present invention allows for the organization to maintain multiple configuration versions of the same resource at the same time in order to test the configurations changes in various environments independently and simultaneously.

The present invention provides a configuration application that includes one or more user interfaces that allow the one or more users to view and edit configuration data that is stored in a relational database table (e.g., illustrating the main configuration and the associated configuration branches in process). The main configuration table with main configurations are in sync with the configurations of the production resource, while the multiple branches start with the main configurations, which are modified, deployed, tested, and/or implemented into the production resource independently. Moreover, the changes within an individual branch that are implemented into a production resource may be made in the other branches to facilitate modifying and testing the most recent configurations within each branch for the same resource. Furthermore, the configuration application provides the ability to automatically create scripts from stored scripts patterns in order to export the scripts with the configuration changes from the branches to the production resource in the same way in order to mitigate (e.g., reduce, prevent, or the like) any errors that might occur from users independently generating scripts to update configurations within a production resource. Moreover, the present invention provides the ability to identify any discrepancies between configuration changes in multiple configuration branches for the same resource in order to identify any conflicts arising between changes within each configuration branch for a production resource. Additionally, the configuration application provides the ability to export the conflicts between two or more branches so that the conflicts can be reviewed by users (e.g., online or offline), modified, and imported back to the main configuration, the additional branches, and/or the production resource in order to resolve the conflicts. The present invention provides the ability to manage various application configuration tables without any code changes. As such, the configuration application and/or system is configured to manage any number of configuration tables for any number of resources, and moreover, allow for updating the configurations of the production resources without having to crate code to update such configuration changes within the production resources.

The present invention is an improvement over current configuration systems and/or applications, in part, because current configuration systems require scripting skills which disable business agility by enforcing a more rigorous software development process around the creation and deployment of the scripts in order to implement configuration changes.

As such, the present invention provides systems, methods and computer program products that improve the efficiency and processing speeds of configuration implementation systems. The present invention allows for maintaining up to date configurations of the production resources as the configuration changes are implemented over time in order to more efficiently and accurately test and deploy configuration changes that are simultaneously being developed. Moreover, the present invention improves memory requirements of the system because the system only needs to store the configuration changes within each branch that have changed from the main branch. Since there is a main configuration table that mirrors the production version, each branch may only require the storage of the configuration changes and not the entire list of configurations for the production resource. Moreover, the speed and accuracy with which configuration changes may be implemented is greatly improved to mins, hours, or the like, because the script patterns are used to automatically create scripts that are uniform regardless of the user making the changes, which can be implemented immediately to implement the configuration changes shortly after they are tested. As such, the present invention improves the efficiency, capacity, memory, accuracy, and/or speed of implementation of configuration changes over the current configuration implementation systems.

Embodiments of the invention comprise systems, computer implemented methods, and computer program products for resource configuration migration and implementation in one or more resources utilizing multiple configuration branches. The invention comprises receiving a request to create a first branch configuration table, and creating the first branch configuration table with first branch configurations by duplicating main configurations from a main configuration table into the first branch configuration table. The invention further comprises receiving a request to modify at least one of the first branch configurations in the first branch configuration table, and modifying the at least one of the first branch configurations. The invention also comprises receiving a request to create one or more additional branch configuration tables, and creating the one or more additional branch configuration tables with additional branch configurations by duplicating the main configurations from the main configuration table into the one or more additional branch configuration tables. The invention further comprises receiving a request to modify at least one of the additional branch configurations from the one or more additional branch configuration tables, and modifying the at least one of the additional branch configurations from the one or more additional branch configuration tables. The invention also comprises implementing the at least one of the first branch configurations that were modified into a production resource, and updating the main configurations in the main configuration table with the at least one of the first branch configurations that were implemented into the production resource to form updated main configurations in the main configuration table. The invention further comprises comparing the at least one of the first branch configurations that were modified with the at least one of the additional branch configurations that were modified from the one or more additional branch configurations.

In further accord with embodiments of the invention, comparing the at least one of the first branch configurations that were modified comprises merging the at least one of the first branch configurations that were modified into the one or more additional branch configuration tables, determining discrepancies between the at least one of the first branch configurations that were modified with the at least one of the additional branch configurations that were modified from the one or more additional branch configurations, and displaying the discrepancies to a user on a user computer system.

In other embodiments of the invention, displaying the discrepancies to the user on the user computer system comprises exporting the discrepancies between the at least one of the first branch configurations that were modified and the one or more additional branch configurations to a configuration conflict table, and presenting the configuration conflict table with the discrepancies to the user for editing.

In still other embodiments of the invention, presenting the discrepancies in the configuration conflict table comprises listing the at least one of the first branch configurations and the at least one of the additional branch configurations that do not match.

In yet other embodiments, the invention further comprises receiving a request to edit the configuration conflict table to eliminate the at least one of the first branch configurations, the at least one of the additional branch configurations, or eliminate both the at least one of the first branch configurations and the at least one of the additional branch configurations and create at least one hybrid configuration using the at least one of the first branch configurations and the at least one of the additional branch configurations. The invention further comprises modifying the configuration conflict table according to the request, and importing at least the modifications to the configuration conflict table to the at least one additional branch configurations.

In further accord with embodiments, the invention comprises automatically updating the one or more additional branch configurations in the one or more additional branch configuration tables based on the discrepancies.

In other embodiments, the invention comprises deploying the first branch configurations to a test environment within a test resource, and wherein the first branch configurations are tested within the test environment within the test resource in order to determine one or more errors caused by the first branch configurations.

In still other embodiments, the invention comprises deploying the additional branch configurations to a test environment within a test resource, and wherein the additional branch configurations are tested within the test environment within the test resource in order to determine one or more errors caused by the additional branch configurations.

In yet other embodiments of the invention, each of the requests are received from one or more users using a user computer system.

In further accord with embodiments, the invention comprises receiving one or more script patterns for the one or more resources, wherein the one or more script patterns are used to automatically create one or more scripts for updating one or more resource configurations for the one or more resources, and storing the one or more script patterns.

In other embodiments of the invention, implementing the at least one first branch configurations that were modified to the production resource comprises accessing the one or more script patterns for the production resource, creating the one or more scripts for the production resource, and updating the one or more resource configurations for the one or more resources based on the one or more scripts.

In still other embodiments, the invention further comprises creating the main configuration table by identifying the resource configurations of the production resource, and copying the resource configurations of the production resource into the main configuration table.

To the accomplishment of the foregoing and the related ends, the one or more embodiments comprise the features hereinafter described and particularly pointed out in the claims. The following description and the annexed drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
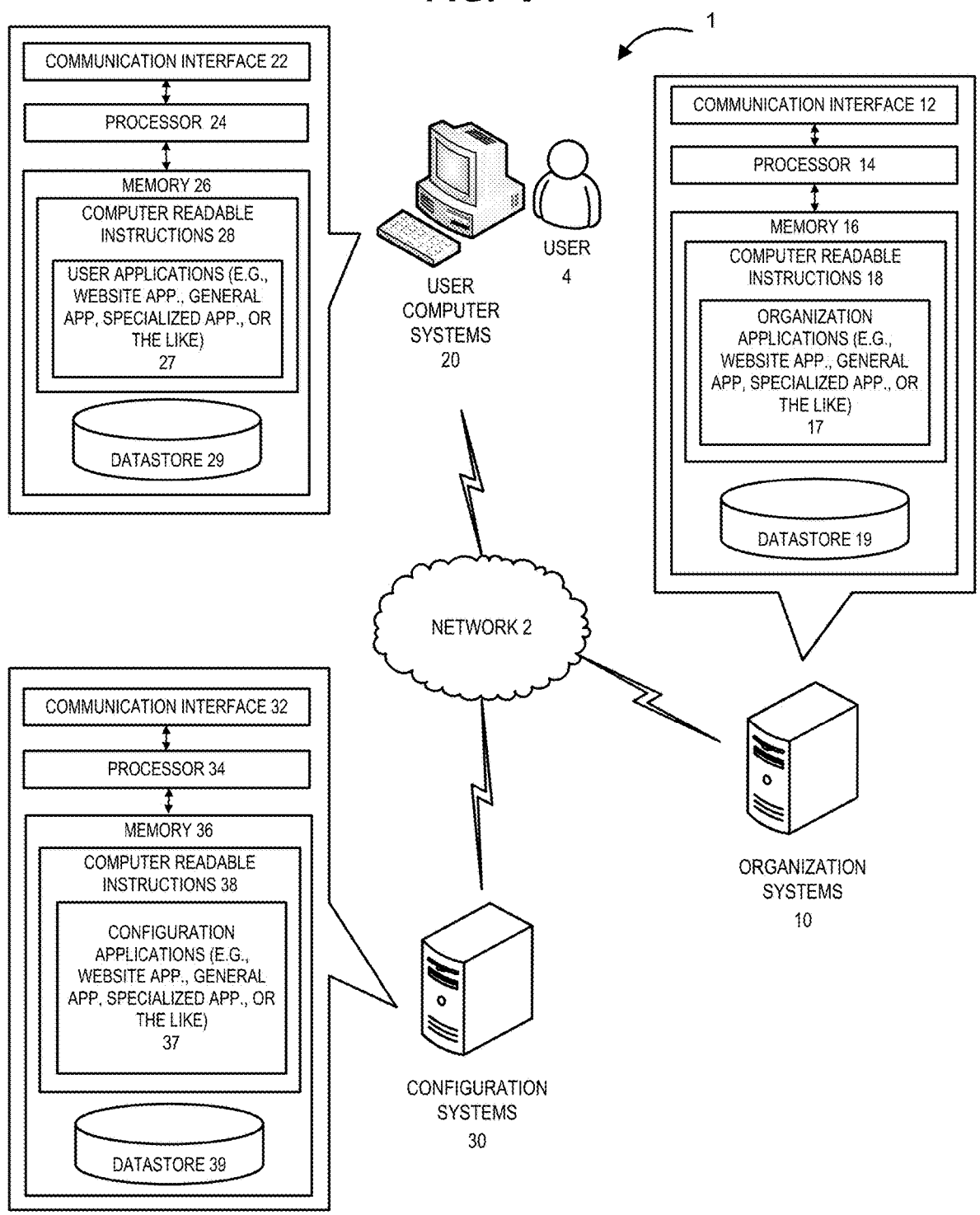

Having thus described embodiments of the invention in general terms, reference will now be made to the accompanying drawings, and wherein:

FIG. 1 illustrates a block diagram of a configuration implementation system environment, in accordance with one or more embodiments of the invention.

Figure 2:
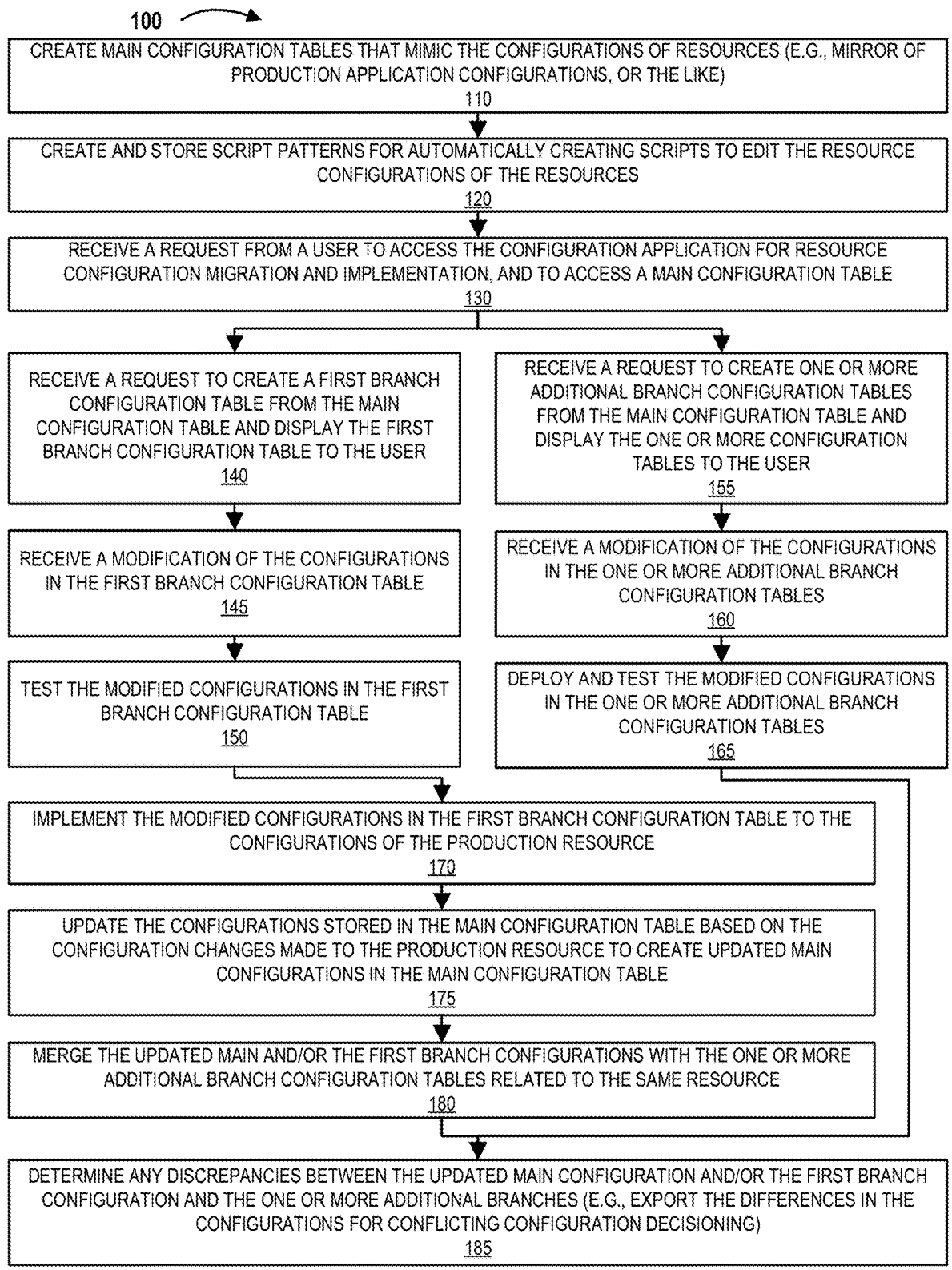

FIG. 2 illustrates a resource configuration migration and implementation process, in accordance with one or more embodiments of the invention.

Figure 3:
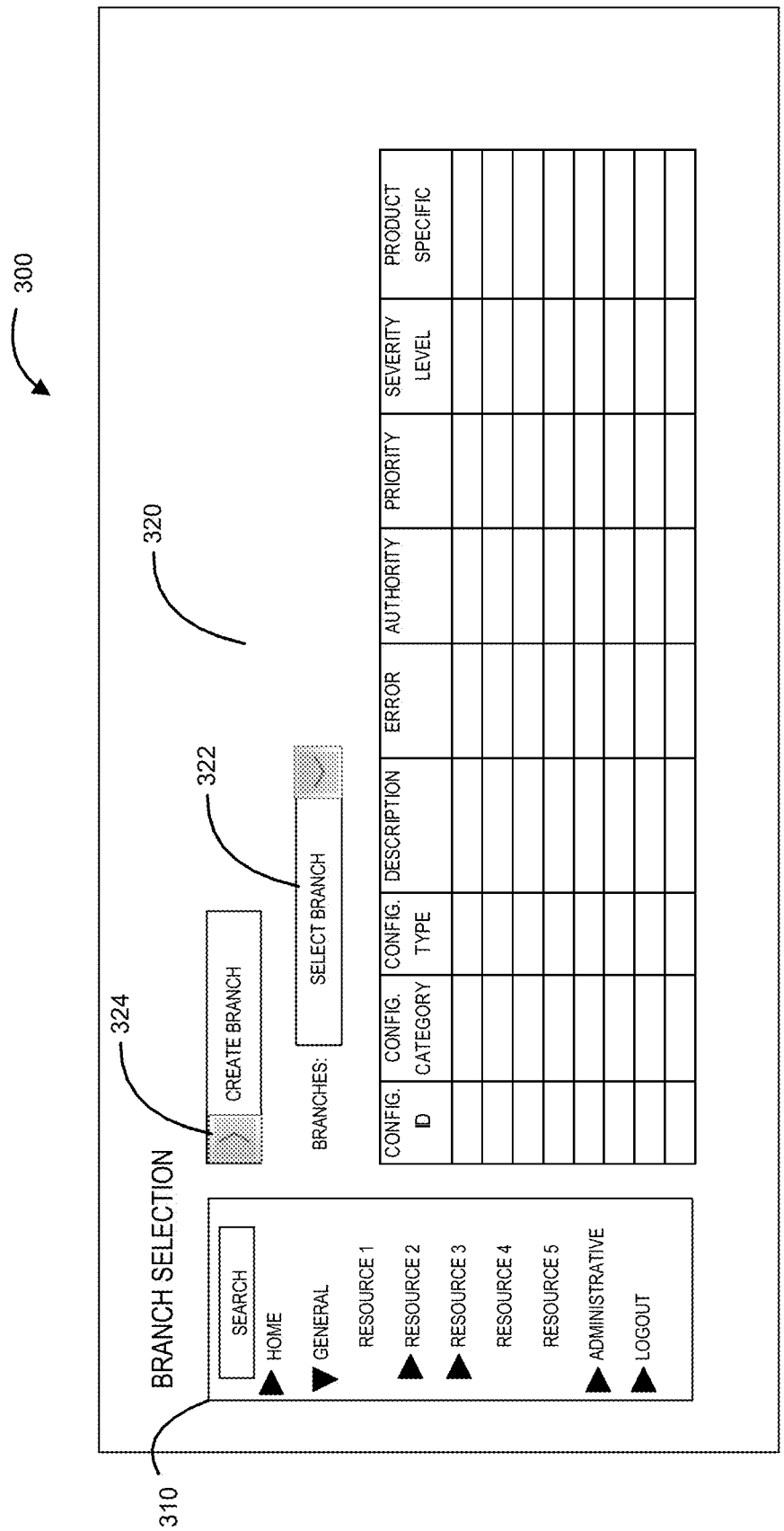

FIG. 3 illustrates a branch selection interface, in accordance with one or more embodiments of the invention.

Figure 4:
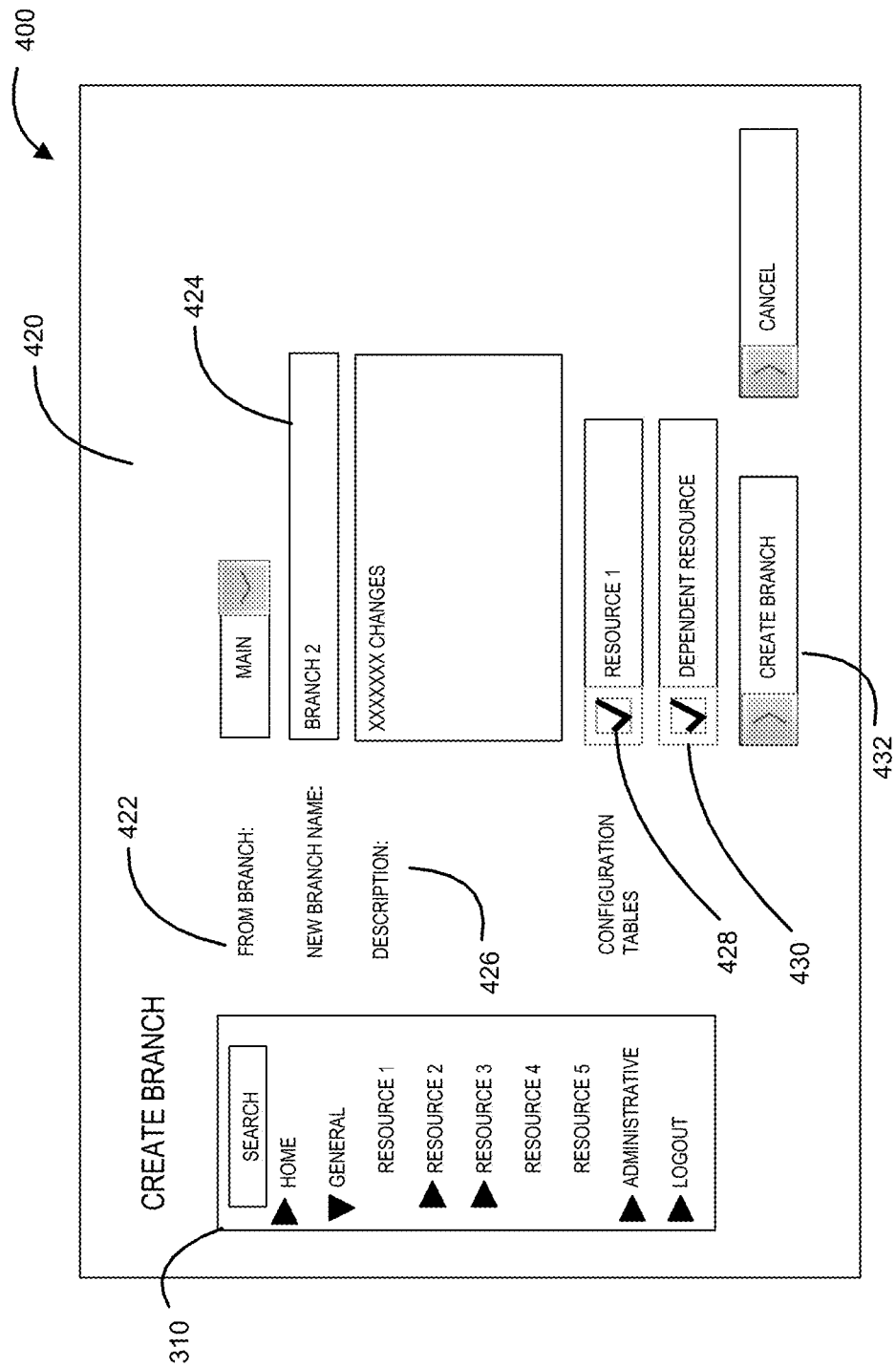

FIG. 4 illustrates a branch creation interface, in accordance with one or more embodiments of the invention.

Figure 5:
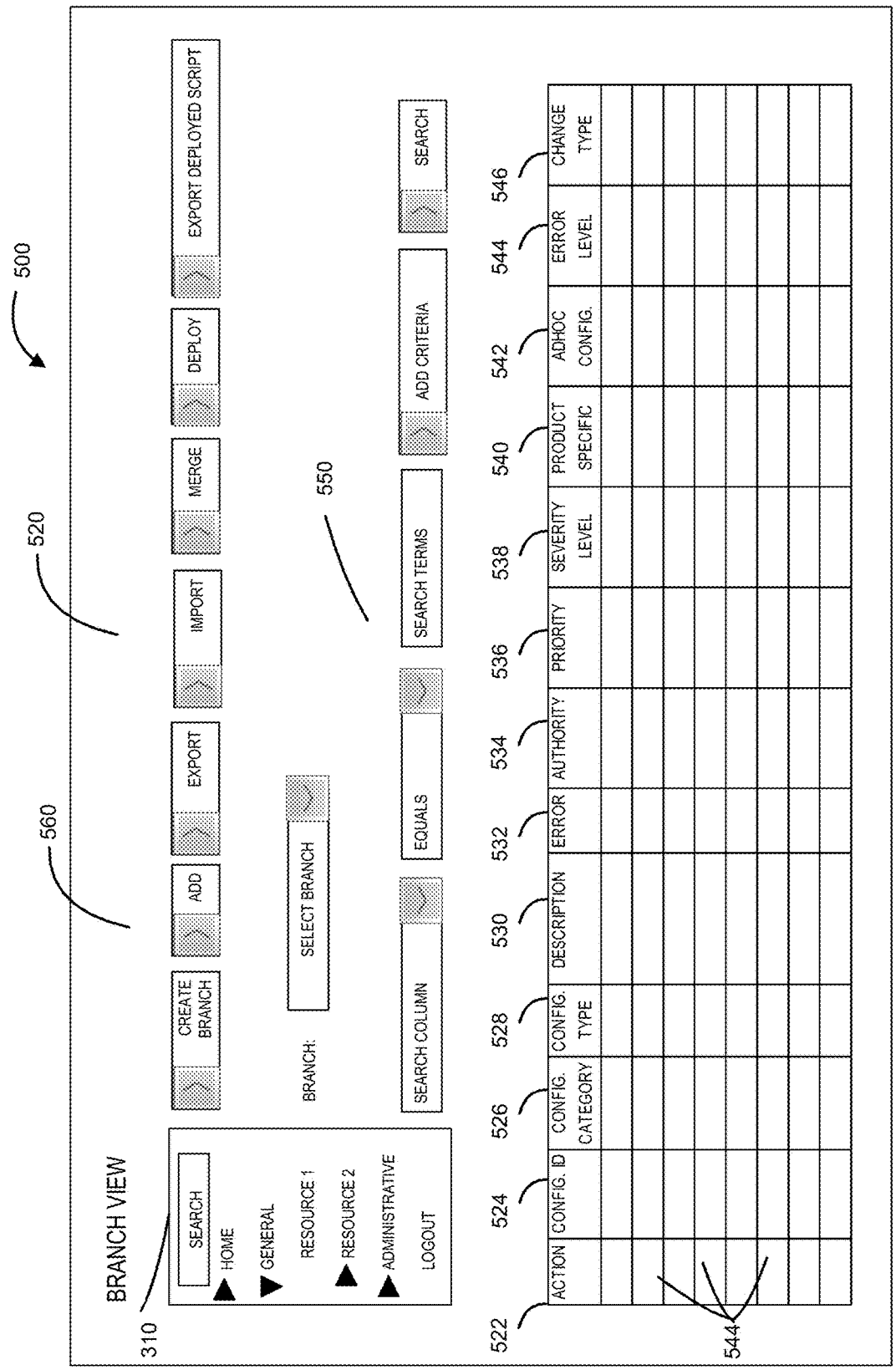

FIG. 5 illustrates a branch configuration view interface, in accordance with one or more embodiments of the invention.

Figure 6:
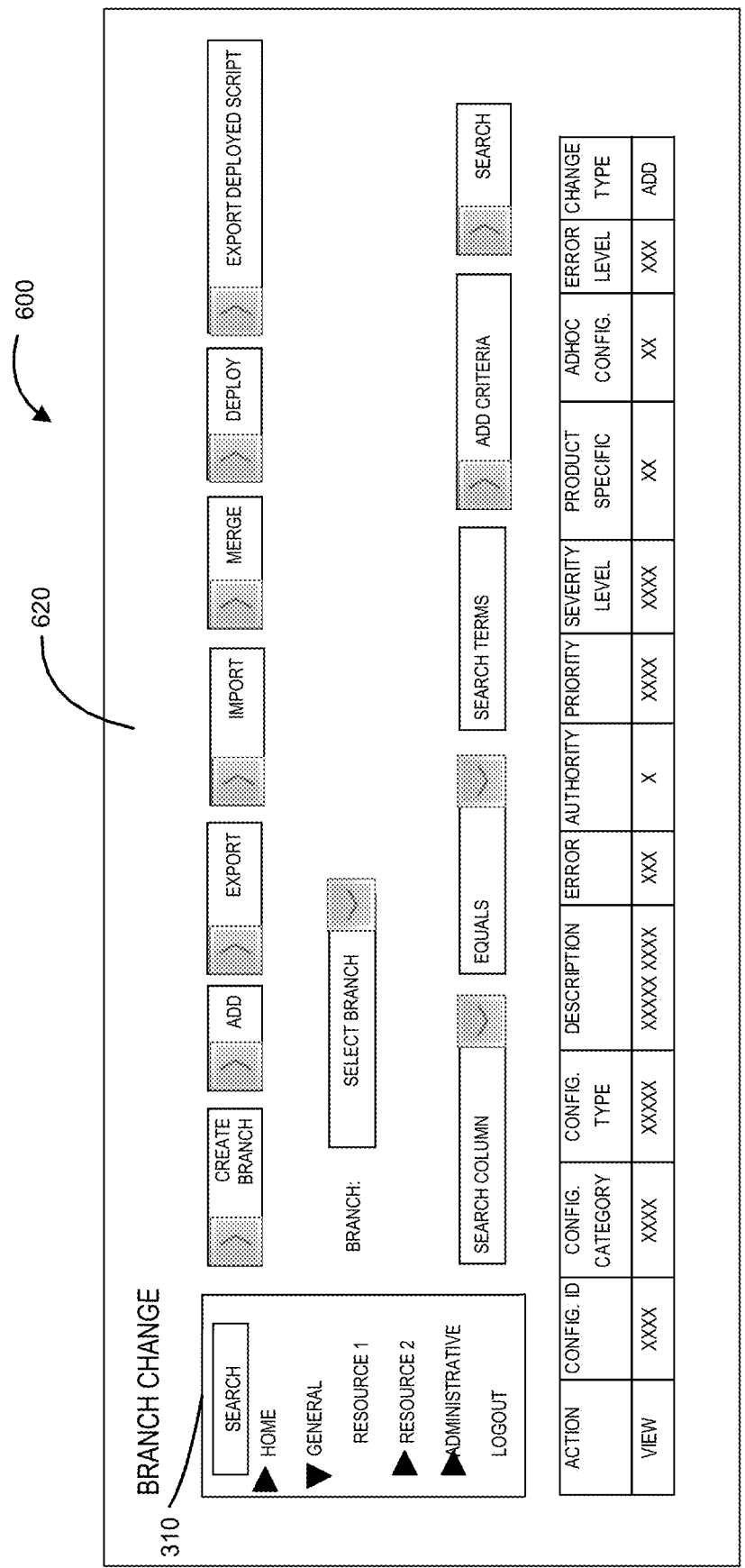

FIG. 6 illustrates a branch configuration change interface, in accordance with one or more embodiments of the invention.

Figure 7:
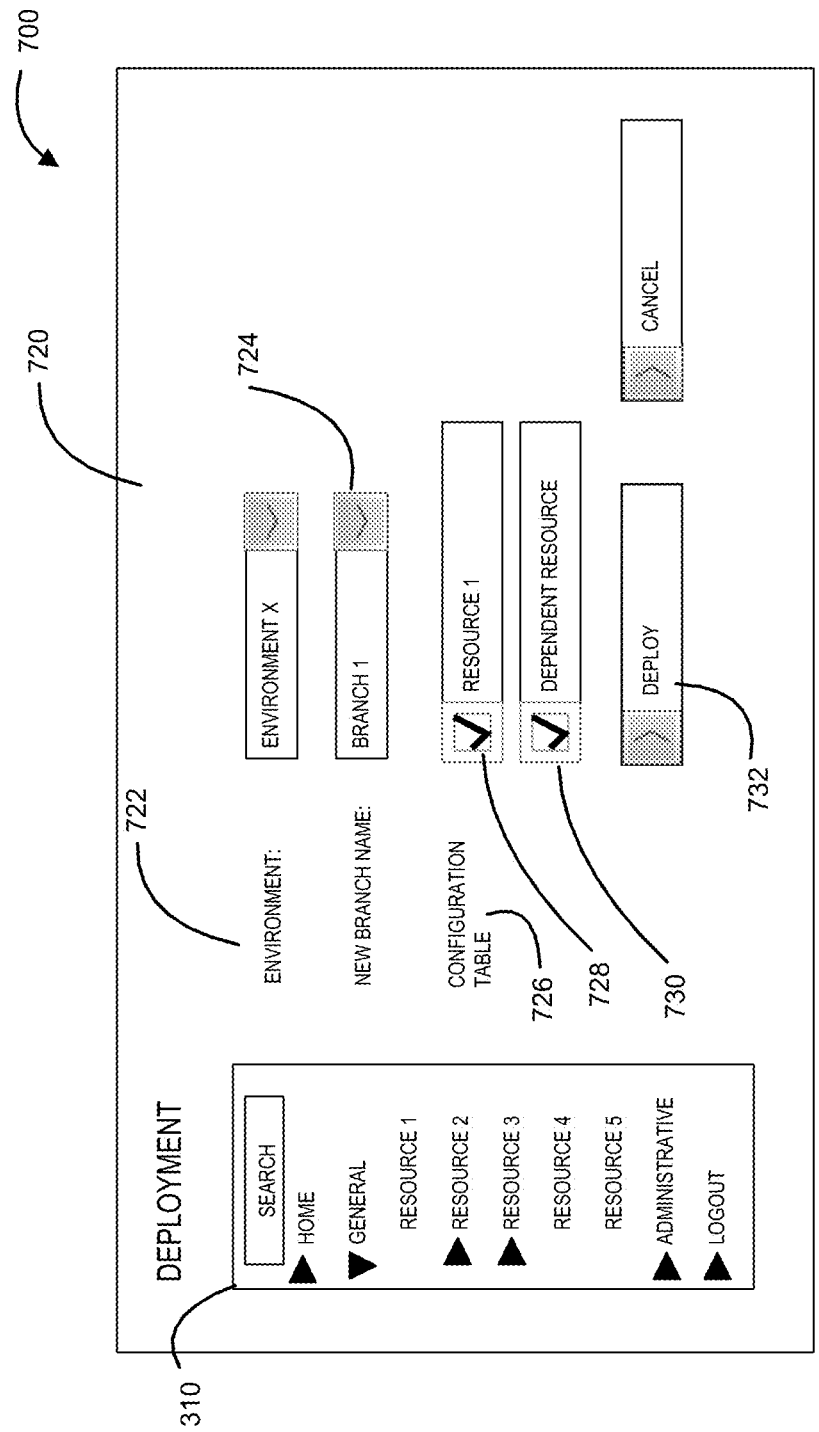

FIG. 7 illustrates a branch configuration deployment interface, in accordance with one or more embodiments of the invention.

Figure 8:
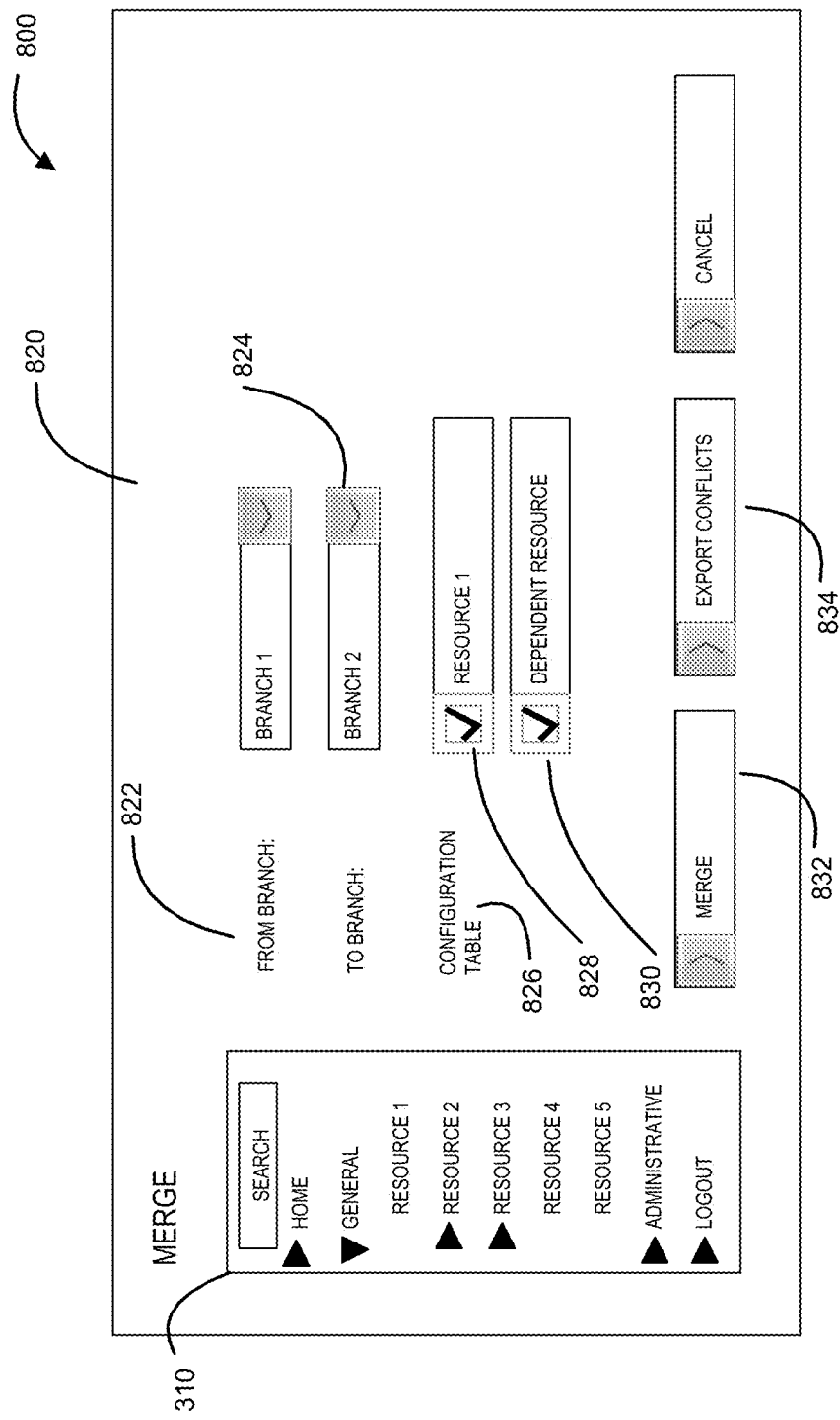

FIG. 8 illustrates a branch configuration merge interface, in accordance with one or more embodiments of the invention.

FIG. 9 illustrates a configuration conflict interface, in accordance with one or more embodiments of the invention.

Figure 10:
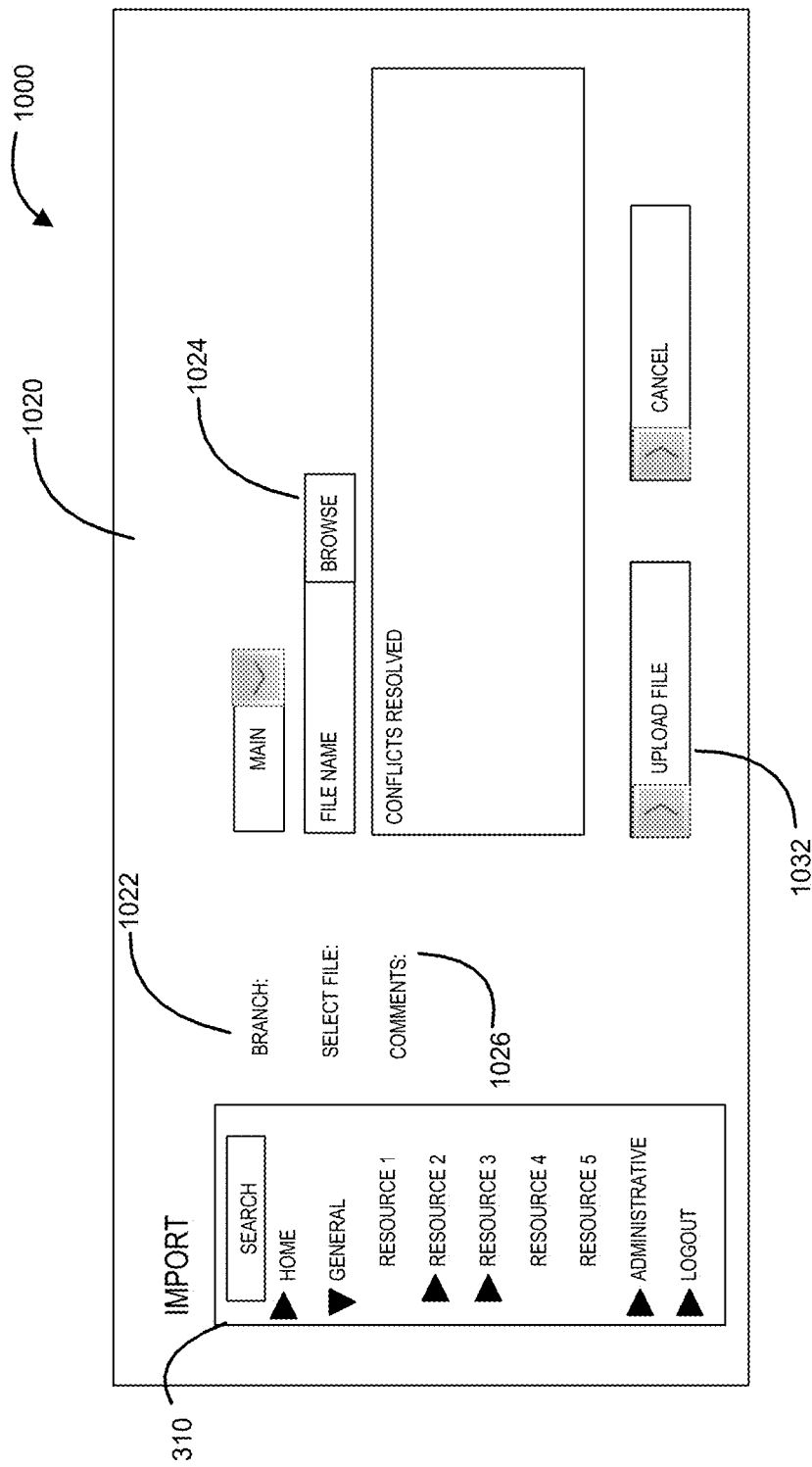

FIG. 10 illustrates a configuration import interface, in accordance with one or more embodiments of the invention.

DETAILED DESCRIPTION OF EMBODIMENTS OF THE INVENTION

Embodiments of the invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

Systems, methods, and computer program products are herein disclosed for a configuration implementation system and/or applications therefor. The configuration implantation system and/or applications therefor allow users maintain configurations for production resources (e.g., application, systems, or the like) in a main configuration table, and multiple versions of the configurations in branch configuration tables in order to deploy and test the branch configurations independently of each other based on implementation schedules. Moreover, the configurations in the configuration branches can be implemented in various releases for the production resource, as necessary, and merged into the other branches in order to maintain consistency with the production resource and to identify any discrepancies between the configuration branches.

The present invention allows for maintaining a complex technical configuration environment with an organization release calendar wherein various integrated releases are planned days, weeks, months, or the like in advance. Moreover, the present invention allows for implementation of the configuration changes into the production resource within a short turnaround time (e.g., days or weeks) as opposed to the months it may typically take to implement such changes. The present invention allows for the organization to maintain multiple configuration version of the same resource at the same time in order to test the configurations changes in various environments independently and simultaneously. The present invention is an improvement over current configuration systems and/or applications, in part, because current configuration systems and/or applications require scripting skills which disable business agility by enforcing a more rigorous software development process around the creation and deployment of the scripts in order to implement configuration changes. As such, the present invention provides a more efficient and timely process for testing and implementing configuration changes at the same time, while reducing memory requirements in having to store entire versions of the multiple resources and configurations over time in order to test and implement the multiple resources.

FIG. 1 illustrates a configuration implementation system environment 1, in accordance with embodiments of the invention. As illustrated in FIG. 1, one or more organization systems 10 are operatively coupled, via a network 2, to one or more user computer systems 20, one or more configuration systems 30, and/or one or more other systems (not illustrated). In this way, the one or more organization systems 10 may be systems that run the applications that the organization uses within the organization's operations. The users 4 (e.g., one or more associates, employees, agents, contractors, sub-contractors, third-party representatives, customers, or the like), may include the users 4 that are responsible for and/or use the organization applications that are utilized by the organization during the operation of the organization. As such, the one or more organization systems 10 may be utilized by the users 4 for the operation of the organization through communication between the one or more organization systems 10 and the one or more user computer systems 20, and moreover, the users 4 may use the one or more user computer systems 20 to communicate with the one or more configuration systems 20 to implement (e.g., define, test, make, or the like) the configuration changes for the one or more organization systems 10 and/or the one or more user computer systems 20, and/or the applications thereof. As such, the one or more configuration systems 20 may communicate with the one or more organization systems 10 directly and/or through the use of the one or more user computer systems 20 in order to send and receive data and/or instructions regarding the configurations of the applications of the one or more organization systems 10 and/or one or more user configuration systems 20.

The network 2 illustrated in FIG. 1 may be a global area network (GAN), such as the Internet, a wide area network (WAN), a local area network (LAN), or any other type of network or combination of networks. The network 2 may provide for wireline, wireless, or a combination of wireline and wireless communication between systems, servers, components, and/or devices on the network 2.

As illustrated in FIG. 1, the one or more organization systems 10 generally comprise one or more communication components 12, one or more processor components 14, and one or more memory components 16. The one or more processor components 14 are operatively coupled to the one or more communication components 12 and the one or more memory components 16. As used herein, the term "processor" generally includes circuitry used for implementing the communication and/or logic functions of a particular system. For example, a processor component 14 may include a digital signal processor, a microprocessor, and various analog-to-digital converters, digital-to-analog converters, and other support circuits and/or combinations of the foregoing. Control and signal processing functions of the system are allocated between these processor components according to their respective capabilities. The one or more processor components 14 may include functionality to operate one or more software programs based on computer-readable instructions 18 thereof, which may be stored in the one or more memory components 16.

The one or more processor components 14 use the one or more communication components 12 to communicate with the network 2 and other components on the network 2, such as, but not limited to, the one or more user computer systems 20, the one or more configuration systems 30, and/or one or more other systems (not illustrated). As such, the one or more communication components 12 generally comprise a wireless transceiver, modem, server, electrical connection, electrical circuit, or other component for communicating with other components on the network 2. The one or more communication components 12 may further include an interface that accepts one or more network interface cards, ports for connection of network components, Universal Serial Bus (USB) connectors and the like.

As further illustrated in FIG. 1, the one or more organization systems 10 comprise computer-readable instructions 18 stored in the one or more memory components 16, which in one embodiment includes the computer-readable instructions 18 of organization applications 17 (e.g., web-based applications, dedicated applications, specialized applications, or the like that are used to operate the organization, which may be internal and/or external applications). In some embodiments, the one or more memory components 16 include one or more data stores 19 for storing data related to the one or more organization systems 10, including, but not limited to, data created, accessed, and/or used by the one or more organization applications 17. The one or more organization applications 17 may be applications that are specifically used for operating the organization (e.g., the external and/or internal operation of the organization), such as by communicating (e.g., interacting with) the one or more user computer systems 20 and user applications 27, the one or more configuration systems 30 and configuration applications 37 thereof, and/or other systems.

As illustrated in FIG. 1, users 4 may try to access the one or more organization systems 10 in order to operate the organization and/or access the one or more configuration systems 30 in order to implement configuration changes in the organization systems 10 and/or user computer systems 20 (e.g., in the systems and/or applications thereof). The users 4 may utilize the one or more user computer systems 20 to communicate with and/or access information from the organization systems 10 and/or from other user computer systems 20, and moreover, communicate with and/or access the one or more configuration systems to implement the configuration changes in the organization systems 10 and/or in the other user computer systems 20. As such, it should be understood that the one or more user computer systems 20 may be any type of device, such as a desktop, mobile device (e.g., laptop, smartphone device, PDA, tablet, watch, wearable device, or other mobile device), server, or any other type of system hardware that generally comprises one or more communication components 22, one or more processor components 24, and one or more memory components 26, and/or the user applications 27 used by any of the foregoing, such as web browsers, applications, dedicated applications, specialized applications, or portions thereof.

The one or more processor components 24 are operatively coupled to the one or more communication components 22, and the one or more memory components 26. The one or more processor components 24 use the one or more communication components 22 to communicate with the network 2 and other components on the network 2, such as, but not limited to, the one or more organization systems 10, the one or more configuration systems 30, and/or the one or more other systems (not illustrated). As such, the one or more communication components 22 generally comprise a wireless transceiver, modem, server, electrical connection, or other component for communicating with other components on the network 2. The one or more communication components 22 may further include an interface that accepts one or more network interface cards, ports for connection of network components, Universal Serial Bus (USB) connectors and the like. Moreover, the one or more communication components 22 may include a keypad, keyboard, touchscreen, touchpad, microphone, speaker, mouse, joystick, other pointer, button, soft key, and/or other input/output(s) for communicating with the users 4.

As illustrated in FIG. 1, the one or more user computer systems 20 may have computer-readable instructions 28 stored in the one or more memory components 26, which in one embodiment includes the computer-readable instructions 28 for user applications 27, such as dedicated applications (e.g., apps, applet, or the like), portions of dedicated applications, a web browser or other applications that allow the one or more user computer systems 20 to operate the organization and/or use the configuration systems 30 to access and/or take various actions with respect to the configurations of the one or more organizations systems 10 or on other user computer systems 20, or the applications thereof, through the use of the one or more user computer systems 20, or the like.

As illustrated in FIG. 1, the one or more configuration systems 30 may communicate with the one or more organization systems 10 and/or the one or more user computer systems 20 directly or indirectly. The one or more configuration systems 30, as will be described in further detail herein, may be utilized to control the configurations of the one or more organizations systems 10 and/or the one or more user computer systems 20, including the applications thereof. As such, the one or more configuration systems 30 are operatively coupled, via a network 2, to the one or more organization systems 10, the one or more user computer systems 20, and/or the one or more other systems (not illustrated). The one or more configuration systems 30 generally comprise one or more communication components 32, one or more processor components 34, and one or more memory components 36.

The one or more processor components 34 are operatively coupled to the one or more communication components 32, and the one or more memory components 36. The one or more processor components 34 use the one or more communication components 32 to communicate with the network 2 and other components on the network 2, such as, but not limited to, the one or more organization systems 10, the one or more user computer systems 20, and/or the one or more other systems (not illustrated). As such, the one or more communication components 32 generally comprise a wireless transceiver, modem, server, electrical connection, or other component for communicating with other components on the network 2. The one or more communication components 32 may further include an interface that accepts one or more network interface cards, ports for connection of network components, Universal Serial Bus (USB) connectors and the like.

As illustrated in FIG. 1, the one or more configuration systems 30 may have computer-readable instructions 38 stored in the one or more memory components 36, which in some embodiments includes the computer-readable instructions 38 of one or more configuration applications 37 that allow the users to view, modify, test, and/or implement the configuration changes for the organization systems 10 and/or user computer systems 20, as will be described herein.

Moreover, the one or more other systems (not illustrated) may be operatively coupled to the one or more organization systems 10, the one or more user computer systems 20, and/or the one or more configuration systems 30, through the network 2. The other systems may be one or more intermediate systems and/or third party systems that communicate with and/or allow communication between the one or more organization systems 10, the one or more user computer systems 20, and/or the one or more configuration systems 30 (e.g., one or more communication components, one or more processor components, and one or more memory components with computer-readable instructions of one or more applications, one or more datastores, or the like). Thus, the one or more other systems communicate with the one or more organization systems 10, the one or more user computer systems 20, the one or more third-party systems 30, and/or each other in same or similar way as previously described with respect to the one or more organization systems 10, the one or more user computer systems 20, and/or the one or more configuration systems 30.

FIG. 2 illustrates a process flow for utilizing the configuration application 37 described herein for resource configuration migration and implementation utilizing multiple branches of configurations. As illustrated in block 110 of FIG. 2, before the configuration application 37 is utilized by users 4 to create configuration branches for testing and implementation of resource configurations, main resource configuration tables are created for the one or more resources of the organization. For example, a main configuration table is created for a production resource (e.g., version being utilized by the organization) and is populated with the configurations of the production resource. For example, the main configuration table lists the resource configurations that mirror the configurations of the production resource. The main configuration tables for each of the production resources are created and stored for access through the configuration application 37. Moreover, it should be understood that access rights for users 4 to access and utilize the main configuration tables for implanting configuration changes may be made and stored, such that access to the main configuration tables are controlled.

Additionally, as illustrated by block 120 in FIG. 2, it should be understood that in some embodiments a scrip pattern is created for each production resource and/or configuration thereof. For example, a script pattern is created such that the script pattern may be used to update the production resource when the resource configurations are changed. The script patterns store the framework that is used to automatically edit the resource configurations, as will be described herein. As such, when the main configurations are changed in a branch (as will be described herein), deployed to an environment, tested, and implemented, the system uses the scrip pattern to automatically create the script that is used to implement the configuration changes in the branch into a production version of the resource. The use of the script pattern allows each user that changing, deploying, testing, and/or implementing configuration changes to implement the configuration changes to the production resource using the same framework. As such, the resource pattern reduces the number of errors that could occur if each individual user created their own script to implement a resource configuration change.

Block 130 of FIG. 2 illustrates that the organization receives a request from one or more users 4 to access the configuration application 37. In order to utilize the configuration application, the one or more users 4 may log into the configuration application. In some examples, access to the main configuration tables for resources may be restricted based on the user's access rights determined by the authentication of the user (e.g., when the user logs into the configuration application). Once the one or more users 4 are authenticated, the one or more users are able to access the main configurations for one or more resources in a number of different ways. As illustrated in FIG. 3, a resource selection section 310 may be provided, which allows the one or more users 4 to select one or more main configurations within one or more interfaces within the configuration application 37. In one example, links may be provided to the main configuration tables for various resources, such as the main configuration tables for which the one or more users have been authorized to access (e.g., based on the user authentication and user access rights). In other embodiments the one or more users 4 may access the main configurations tables through other features (e.g., drop-down menus, search functions, tree hierarchy, or the like).

Moreover, as illustrated in block 130 a request may be received from a user 4 to access, view, and/or modify the resource configurations of a resource (e.g., access, view, and/or edit a main configuration table associated with a resource). In response, the configuration application 37 may present a branch creation interface 300 to the user 4 on the user computer systems 10. As illustrated in FIG. 3, the branch selection interface 300 may include a resource selection section 310 (as described above) and a branch selection section 320 that includes a branch selection feature 322 and branch creation feature 324. It should be understood that "feature," as described herein may be any type of feature, such as a button, drop-down, +/− expansion, hierarchy tree, search, drag and drop, or any other feature that allows a user make selections in the one or more interfaces.

Block 140 of FIG. 2 illustrates that the organization receives a request from a user 4 to create a first branch configuration table. In some embodiments, the branch may be created for a specific time period (e.g., weekly changes, monthly changes, or the like) and/or for a specific purpose (e.g., resource update, or the like). For example, as illustrated in FIG. 3, the user 4 may select a previously created branch to access using the branch selection feature 322 and/or create a new branch using the branch creation feature 324. In the case of creating a new branch the organization may present to the user 4 a branch creation interface 400 on the user computer systems 20 through the configuration application 37. The branch creation interface 400, in some embodiments, may include a branch creation section 420 that includes a from selection feature 422, a branch name feature 424, a branch description feature 426, a resource selection feature 428, a dependent resource selection feature 430, a create branch feature 432. As such, the user 4 may select from which main configuration table, or branch configuration table, to create the new branch (e.g., first branch configuration) using the from selection feature 422. For example, the user 4 may create the new branch from a main configuration table (e.g., that corresponds to the configurations of a production resource). Alternatively, the user 4 may be able to create a new branch from other branches that are currently being edited, deployed, and/or tested in order to create alternate configuration branches for configuration branches that are currently in process (e.g., test changes to changes that are already being tested, or the like). The branch name feature 424 and/or branch description feature 426 allows the user 4 and other users 4 to modify, deploy, test, and/or implement different branches with different configuration changes for the same resource and to compare branches to each other, as will be discussed in further detail later. The resource selection feature 428 illustrates the resources for which the branch is being created, and the dependent resource selection feature 430 illustrates the one or more dependent resources which have a relationship with the selected resource. As such, branch configuration tables will be created for the selected resource, as well as for any dependent resources that have a relationship with the selected resource. In this way, the user 4 is aware of the relationships that the selected resource has with dependent resources, and moreover, is able to change, deploy, and/or test configuration changes within a branch for the selected resource, as well as for any dependent resources at the same time (e.g., within the same branch or in different branches that reference each other). As such, the configuration changes may be made efficiently and accurately in one or more branches for related resources.

As further described in block 140 of FIG. 2, after the user selects the create branch feature 432, the configuration application 37 captures the resource configurations from the table of the selected branch (e.g., the main configuration table, or the like), creates the table for the new branch (e.g., first configuration branch table) and any dependent branches, if any, and displays the new branch table (e.g., first configuration branch table) to the user 4. For example, the one or more configurations from a main configuration table are copied into the newly created first branch configuration table. Moreover, the configuration application 37 presents the new branch configuration table (e.g., the first branch configuration table) to the user in a configuration branch view interface 500, as illustrated in FIG. 5. As illustrated in FIG. 5 the configuration branch view interface 500, may include the resource selection section 310, previously discussed, and a configuration information section 520. The configuration information section 520 provides information regarding each configuration for the newly created branch configuration table (e.g., which mirrors the configurations in the table from which the configurations were copied). The information may include a configuration action 522, configuration ID 524, configuration category 526, configuration type 528, configuration description 530, error 532, configuration authority 534, priority 536, error severity level 538, product specific 540, adhoc configuration 542, error level 544, change type 546, or the like. This information within the branch view interface 500 may be specific to the particular resource for which the user 4 is viewing, modifying, deploying, testing, and/or implementing configuration changes. It should be understood that each of the production resources, and thus the configuration tables (e.g., main and/or each branch configuration), within the configuration application 37 may have hundreds, thousands, or tens of thousands of configurations. As such, the configuration application 37, as illustrated for example in the branch view interface 500, may have configuration search function features 550 (e.g., column selection, search limitation—equals, contains, etc., keyword input, or the like) to allow the user 4 to search the configuration tables in various interfaces. Moreover, it should be understood that the configuration application 37, may include control features 560 that allow the user 4 to create branches, add/edit/delete configurations, export configurations, import configurations, merge configurations, deploy configurations, export deployed scripts to the production resources, or the like as described herein.

Block 145 of FIG. 2 illustrates that modifications of the configurations in the first branch configuration table are received from the user 4. As illustrated in FIG. 5, the user 4 may add, edit, delete, or the like various configurations within the first branch configuration table. For example, the user 4 may select an add configuration, edit configuration, delete configuration, and/or view configuration feature within action feature 570 in the configuration table, in order to add, edit, delete, or view a configuration in the one or more configuration tables. In response, the configuration application 37 may display an interface for allowing the user 4 to view, edit, delete, add, or a configuration. For example, FIG. 6 illustrates a configuration branch change interface 600 in which a user is adding a new configuration. As illustrated in FIG. 6 the configuration branch change interface 600 may include a configuration change section 620 in which the user may add, edit, or the like a configuration by modifying (e.g., filling out and/or adding) the table with the relevant information for the configuration (e.g., added configuration, edit configuration, or the like). In FIG. 6 only one configuration change has been made by adding a configuration; however, it should be understood that any number of configuration changes may be made within the branch.

FIG. 2 further illustrates in block 150 that the configuration changes made and/or illustrated in FIGS. 5 and 6 are deployed for testing. As illustrated in FIGS. 5 and 6 once the configuration changes are made the user 4 may select a deploy selection feature 552, 652. In response, the configuration application 37 may present the user 4 a configuration deployment interface 700, as illustrated in FIG. 7. The configuration deployment interface 700 may include the resource selection section 310 as previously described above, and a configuration deployment section 720. The configuration deployment section 720 may include a deployment environment selection feature 722, a branch selection feature 724, a resource selection feature 728 and a dependent resource selection feature 730. As such, the user 4 may use the configuration deployment interface 700 to deploy the configuration changes in the branch to an environment for testing. It should be understood that the resource may be utilized in different environments within the organization (e.g., the resource may be utilized by different lines of business, on different systems, or the like). As such, the user 4 may use the environment selection feature 722 and the branch selection feature 724 in order to deploy and test a specific branch in a specific environment. Moreover, the user 4 may select the modified branch, and any dependent branches for deployment for testing. It should be understood that if there are no changes in configurations for the dependent resources configurations, no changes will be deployed for the dependent resources.

When a user 4 selects a deploy feature 732 within the configuration deployment interface 700, the tool identifies the changes in the selected branch and deploys the configuration changes in the selected environment (e.g., in a resource located in a testing environment, or the like). For example, if the first branch configuration table has one-thousand configurations (e.g., 1000 rows within the table) and configuration changes were only made to one configuration, the configuration application 37 may identify the specific configuration that changed (e.g., added, modified, deleted, or the like) and deploys only that specific configuration change the selected environment. By only deploying the changes to the configurations, the system may provide improved efficiency and processing capacity because all configurations do not need to be copied into the resource within the selected environment. The one or more configuration changes are then tested in the selected environment in order to determine the impact of the configuration changes in the resource (e.g., on the execution of the resource, or the like). For example, during testing the configuration changes will be checked to determine if the changes are correct when viewed by a testing user, if the changes create any errors in the resources (e.g., applications, or the like), if the resource is operating properly, or the like. It should be understood that in some embodiments, the actual testing of the configuration changes to the resource are tested by specific test users outside of the configuration application 17. In other embodiments, the configuration application may tested within the configuration application 17.

Block 155, 160, and 165 illustrate that a request is received from a user 4 (e.g., the same user as block 140 or a different user) to create one or more additional branch tables, modify the one or more configurations within the one or more additional branch tables, and deploy the one or more configuration changes for testing in the same way as described with respect block 140, 145, and 150 as described above. As such, the user 4 and/or other users (e.g., one or more users) may create multiple branches to test multiple different configurations changes on multiple different time schedules. For example, a user may create a first branch configuration table from the main configuration table in order to change and test first configuration changes to the main configurations. Meanwhile, a second user may create a second configuration table from the same main configuration table in order to change and test second configuration changes to the main configurations. The first configuration changes and the second configuration changes may be made to different, the same, or to combinations of the different and same main configurations. Moreover, it should be understood that the first configuration changes in the first branch may be changes that will be made and implemented in a matter of hours or days, while the second configuration changes in the second branch may be changes that will be made and implemented in weeks or months. As such, the embodiments described herein allow for one or more users 4 to make configuration changes on different schedules within different branches in order to allow for migration of the configurations for a production resources based on any schedules. Moreover, any configuration changes made within the branches that are eventually implemented into the production resource, can also be merged to the pending branch configuration tables that exist during the implementation of a branch configuration into the production resource (e.g., updating a main configuration and pushing any configuration changes to the remaining pending branches).

As illustrated in block 170 in FIG. 2, after testing (e.g., outside of the configuration application 37, inside the configuration application 37, a combination thereof, or the like) the first branch configurations will eventually be implemented into the production resource (e.g., the production versions of the resources). It should be further understood that the configuration application 37 further supports creating scripts using the stored script patterns in order to update the configurations of the production version of the resource so that implementation of the configuration changes to the production resource is performed uniformly and more efficiently. For example, the one or more users 4 may update the configurations of the production resource through the use of the script patterns and the scripts automatically. As such, the configuration application 37 accesses the script pattern for the particular resource and automatically populates the script pattern based on the one or more configuration changes. This functionality is beneficial in that there is strict control over the process for implementing the configuration changes into the production resource in a uniform matter, which reduces the possibility of errors that the one or more users 4 could make by manually creating the various scripts to update the resource configurations. Moreover, the functionality is beneficial in that it also makes the process more efficient because each user does not have to create every script every time a configuration is change is required in the production resource.

As illustrated in block 175 the configuration changes created and tested within the first branch configuration table will also be made to the main configuration table to create an updated main configuration table for future use when additional branches are created from the main configuration table. It should be understood that the configuration changes created and tested within the first branch configuration table may be made in the production resource and the main configuration table at the same time, may be made in the production resource first and then made in the main configuration table, or may be made in the main configuration table first and then made in the production resource. As such, the production version configurations may be made based on the first branch configuration table and/or the updated main configuration table. Alternatively, the main configuration table changes may be made based on the first branch configuration table and/or the production version configurations.

As illustrated in blocks 170 and 175, while the production resource configurations and/or the main configuration table is updated, the configuration changes have to be implemented to the one or more additional branch configuration tables that are pending (e.g., uses are making configuration changes, deploying, and testing in the one or more other branches). As such, when the organization maintains multiple branches for a single production resource, at some point, the configuration application 37 has to support the merging of earlier branch configuration changes that have been implemented into the production resource into the branch configurations changes that have yet to be implemented.

FIG. 8 illustrates a branch configuration merge interface 800, which allows configuration changes from one branch to be checked against the configurations (e.g., original configurations and/or changed configurations) in additional branches. In some embodiments, FIG. 8 may include the resource selection section 310 previously described herein, and a merge section 820. The merge section 820 may include a merge from feature 822, a merge to feature 824, a resource selection feature 828, and a dependent resource selection feature 830. As illustrated by block 180 in FIG. 2, the configuration changes from the first branch configuration table that were implemented into the production resources are merged with the one or more additional branch configuration tables that are associated with the same production resource (e.g., a second branch configuration table, or the like). For example, within FIG. 8, the user 4 selects from which branch should the configuration changes be accessed using the merge from feature 822 and also selects the branch to which the configuration changes are to be merged using the merge to feature 824. When the user selects the merge feature 832, the configuration application 37 identifies the configuration changes from the first branch configuration table and compares them with the configurations from the selected one or more additional branch configuration tables. If there are no conflicts the configuration changes the configuration application 37 allows the configuration changes from the first branch configuration table to be updated in the one or more additional branch configuration tables without requiring any additional actions. However, if there are conflicts, that is, the same configuration has been modified in both the first branch configuration table that was updated in the production resource and in the one or more additional branch configuration tables pending, then the conflicts may be displayed to the user 4 on the user computer systems 20. It should be understood that while the invention describes that the configuration changes from a first branch are compared with the configurations in the second branch, this could also mean that the updated main configurations from the main configuration table are compared with the configurations in the second branch.

As illustrated by block 185 in FIG. 2, when there are conflicts in the merged configurations, the configuration application 37 determines discrepancies between the selected main configuration table and/or selected branch configuration table and the one or more additional configuration tables. For example, any discrepancies identified may be exported through the use of an export conflict feature 834 selected by the user 4, to a conflict interface (e.g., a spreadsheet, or the like) so that the user 4 can review the conflicts. The conflict interface 900 is illustrated in one embodiment in FIG. 9. The conflict interface 900 may be a conflict table that the user may edit. In some embodiments, the user 4 may modify the configurations in the conflict interface 900 by deleting the undesired configuration, keeping the desired configuration, and/or modifying one of the conflicting configurations, such as the desired configuration. As such, the user 4 may be able to identify any conflicting configurations in order to properly test the current branch configurations based on the other branch configurations that have been implemented into the production resource.

After the conflicting configurations are resolved, the user 4 may be able to implement the modified configurations into the one or more additional branch configuration tables. For example, the user 4 may import the modified configurations in the conflict interface 900 (e.g., the remaining, and potentially edited, configurations in the conflict interface) into the one or more additional branch configuration tables. For example, as illustrated in FIG. 10, the configuration application 37 may present a configuration import interface 1000 to the user 4 in order to allow the user 4 to upload the configurations created from the conflict interface 900 into the one or more desired additional branch configuration tables. The configuration import interface 1000 may include the resource selection section 310 previously described herein, and an import section 1020. The import section 1020 may include a branch selection feature 1022, a file upload selection feature 1024, an import comments feature 1026, and an import feature 1032. In this way a user 4 may use the branch selection feature 1022 to select the one or more branch configuration tables and the file with the configuration changes in order to import the configurations from the resolved conflict interface 900 into the one or more branch configuration tables. The updated configurations from the selected file could be the configuration changes from the first branch configuration table, the proposed configurations from the one or more additional branch configuration tables, and/or a hybrid configuration change from the first branch configuration table and/or the one or more additional branch configuration tables. Moreover, when one or more users view the one or more additional branch configuration tables with the merged configurations, in some embodiments, the merged configurations may be referenced in the descriptions within the one or more additional branch configuration tables.

The merging and importing steps may be made with respect to a single additional branch configuration table or with multiple additional branch configuration tables. For example, configuration changes from a first branch configuration table may be merged with a second branch configuration table for the same resource, or a second, third, fourth, or the like number of branch configuration tables for the same resource at the same time. In other examples, when conflicts occur the configuration changes made based on the conflicts determined may be imported back into the one or more additional branch configurations that are still pending. As such, the present invention allows for increased efficiency in managing an implementing multiple branches with configuration changes for the same resource.

It should be further understood that when a user 4 is described herein as preforming an action within the configuration application 37, the user 4 may be the same user performing each action, or different users may take two or more of the actions (e.g., multiple users may make configuration changes and perform other steps in the same branch). For example, one user may start a branch, but another user may make configurations changes within the same branch. In other examples, one or more users may create, modify, deploy, and/or test the configurations within a first branch configuration table, while one or more other users may create, modify, deploy, and/or test the configuration within one or more additional branch configuration tables (e.g., a second branch configuration table).

The systems and associated applications provide end-to-end capabilities to the organization, line of business thereof, and/or one or more users thereof, to view, modify, test, deploy, implement, and merge configurations of resources using multiple branches. All the configuration changes, and steps thereof, including updating the production resource, can be made immediately and are tracked in tables that can be audited, if necessary. As such, the present invention provides an improved system and process for implementing complex configurations changes for production resources that could be changing simultaneously by different groups within the organization on different schedules.

It should be understood, that the systems described herein may be configured to establish a communication link (e.g., electronic link, or the like) with each other in order to accomplish the steps of the processes described herein. The link may be an internal link within the same entity (e.g., within the same organization) or a link with the other systems. In some embodiments, the one or more systems may be configured for selectively responding to dynamic inquires. These feeds may be provided via wireless network path portions through the Internet. When the systems are not providing data, transforming data, transmitting the data, and/or creating the reports, the systems need not be transmitting data over the Internet, although it could be. The systems and associated data for each of the systems may be made continuously available, however, continuously available does not necessarily mean that the systems actually continuously generate data, but that a systems are continuously available to perform actions associated with the systems in real-time (i.e., within a few seconds, or the like) of receiving a request for it. In any case, the systems are continuously available to perform actions with respect to the data, in some cases in digitized data in Internet Protocol (IP) packet format. In response to continuously receiving real-time data feeds from the various systems, the systems may be configured to update actions associated with the systems, as described herein.

Moreover, it should be understood that the process flows described herein include transforming the data from the different systems (e.g., internally or externally) from the data format of the various systems to a data format associated with a particular display. There are many ways in which data is converted within the computer environment. This may be seamless, as in the case of upgrading to a newer version of a computer program. Alternatively, the conversion may require processing by the use of a special conversion program, or it may involve a complex process of going through intermediary stages, or involving complex "exporting" and "importing" procedures, which may convert to and from a tab-delimited or comma-separated text file. In some cases, a program may recognize several data file formats at the data input stage and then is also capable of storing the output data in a number of different formats. Such a program may be used to convert a file format. If the source format or target format is not recognized, then at times a third program may be available which permits the conversion to an intermediate format, which can then be reformatted.

As will be appreciated by one of skill in the art in view of this disclosure, embodiments of the invention may be embodied as an apparatus (e.g., a system, computer program product, and/or other device), a method, or a combination of the foregoing. Accordingly, embodiments of the invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the invention may take the form of a computer program product comprising a computer-usable storage medium having computer-usable program code/computer-readable instructions embodied in the medium (e.g., a non-transitory medium, or the like).

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the invention may be written in an object oriented, scripted or unscripted programming language such as Java, Pearl, Python, Smalltalk, C++ or the like. However, the computer program code/computer-readable instructions for carrying out operations of the invention may also be written in conventional procedural programming languages, such as the "C" programming language or similar programming languages.

Embodiments of the invention described above, with reference to flowchart illustrations and/or block diagrams of methods or apparatuses (the term "apparatus" including systems and computer program products), will be understood to include that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

Specific embodiments of the invention are described herein. Many modifications and other embodiments of the invention set forth herein will come to mind to one skilled in the art to which the invention pertains, having the benefit of the teachings presented in the foregoing descriptions and the associated drawings. Therefore, it is to be understood that the invention is not to be limited to the specific embodiments disclosed and that modifications and other embodiments and combinations of embodiments are intended to be included within the scope of the appended claims. Although specific terms are employed herein, they are used in a generic and descriptive sense only and not for purposes of limitation.

What is claimed is:

1. A system for resource configuration migration and implementation in one or more resources utilizing multiple configuration branches, the system comprising:

one or more memories having computer readable code stored thereon; and one or more processors operatively coupled to the one or more memories, wherein the one or more processors are configured to execute the computer readable code to:

receive a request to create a first branch configuration table;

create the first branch configuration table with first branch configurations by duplicating main configurations from a main configuration table into the first branch configuration table;

receive a request to modify at least one of the first branch configurations in the first branch configuration table;

modify the at least one of the first branch configurations;

receive a request to create one or more additional branch configuration tables;

create the one or more additional branch configuration tables with additional branch configurations by duplicating the main configurations from the main configuration table into the one or more additional branch configuration tables;

receive a request to modify at least one of the additional branch configurations from the one or more additional branch configuration tables;

modify the at least one of the additional branch configurations from the one or more additional branch configuration tables;

implement the at least one of the first branch configurations that were modified into a production resource based on one or more script patterns for the production resource, wherein the one or more script patterns are used to automatically create one or more scripts for updating one or more resource configurations for one or more resources;
update the main configurations in the main configuration table with the at least one of the first branch configurations that were implemented into the production resource based on the one or more scripts in order to form updated main configurations in the main configuration table;
compare the at least one of the first branch configurations that were modified with the at least one of the additional branch configurations that were modified from the additional branch configurations;
identify discrepancies between the at least one of the first branch configurations that were modified with the at least one of the additional branch configurations that have been modified;
store the discrepancies identified in a configuration conflict table; and
automatically merge the at least one of the first branch configurations that were implemented into the production resource into the at least one of the additional branch configuration tables when the at least one of the additional branch configurations have not been modified.

2. The system of claim 1, further comprising displaying the discrepancies to a user on a user computer system comprises:
exporting the discrepancies between the at least one of the first branch configurations that were modified and the at least one of the additional branch configurations that were modified to the configuration conflict table; and
present the configuration conflict table with the discrepancies to the user for editing.

3. The system of claim 2, wherein presenting the discrepancies in the configuration conflict table comprises listing the at least one of the first branch configurations and the at least one of the additional branch configurations that do not match.

4. The system of claim 3, wherein the one or more processors are further configured to execute the computer readable code to:
receive a request to edit the configuration conflict table to eliminate the at least one of the first branch configurations, the at least one of the additional branch configurations, or eliminate both the at least one of the first branch configurations and the at least one of the additional branch configurations and create at least one hybrid configuration using the at least one of the first branch configurations and the at least one of the additional branch configurations;
modify the configuration conflict table according to the request; and
import at least the modifications to the configuration conflict table to the at least one of the additional branch configurations.

5. The system of claim 1, wherein the one or more processors are further configured to execute the computer readable code to:
deploy the first branch configurations to a test environment within a test resource, and wherein the first branch configurations are tested within the test environment within the test resource in order to determine one or more errors caused by the first branch configurations.

6. The system of claim 1, wherein the one or more processors are further configured to execute the computer readable code to:
deploy the additional branch configurations to a test environment within a test resource, and wherein the additional branch configurations are tested within the test environment within the test resource in order to determine one or more errors caused by the additional branch configurations.

7. The system of claim 1, wherein each of the requests are received from one or more users using a user computer system.

8. The system of claim 1, wherein the one or more processors are further configured to execute the computer readable code to:
receive the one or more script patterns for the one or more resources, wherein the one or more script patterns are used to automatically create one or more scripts for updating the one or more resource configurations for the one or more resources; and
store the one or more script patterns.

9. The system of claim 1, wherein implementing the at least one of the first branch configurations that were modified to the production resource based on the one or more script patterns comprises:
accessing the one or more script patterns for the production resource;
creating the one or more scripts for the production resource; and
updating the one or more resource configurations for the one or more resources based on the one or more scripts.

10. The system of claim 1, wherein the one or more processors are further configured to execute the computer readable code to:
create the main configuration table by:
identifying resource configurations of the production resource; and
copying the resource configurations of the production resource into the main configuration table.

11. A computer implemented method for resource configuration migration and implementation in one or more resources utilizing multiple configuration branches, the method comprising:
receiving, by one or more processors, a request to create a first branch configuration table;
creating, by the one or more processors, the first branch configuration table with first branch configurations by duplicating main configurations from a main configuration table into the first branch configuration table;
receiving, by the one or more processors, a request to modify at least one of the first branch configurations in the first branch configuration table;
modifying, by the one or more processors, the at least one of the first branch configurations;
receiving, by the one or more processors, a request to create one or more additional branch configuration tables;
creating, by the one or more processors, the one or more additional branch configuration tables with additional branch configurations by duplicating the main configurations from the main configuration table into the one or more additional branch configuration tables;
receiving, by the one or more processors, a request to modify at least one of the additional branch configurations from the one or more additional branch configuration tables;
modifying, by the one or more processors, the at least one of the additional branch configurations from the one or more additional branch configuration tables;

implementing, by the one or more processors, the at least one of the first branch configurations that were modified into a production resource based on one or more script patterns for the production resource, wherein the one or more script patterns are used to automatically create one or more scripts for updating one or more resource configurations for one or more resources;

updating, by the one or more processors, the main configurations in the main configuration table with the at least one of the first branch configurations that were implemented into the production resource based on the one or more scripts in order to form updated main configurations in the main configuration table;

comparing, by the one or more processors, the at least one of the first branch configurations that were modified with the at least one of the additional branch configurations that were modified from the additional branch configurations;

identifying, by the one or more processors, discrepancies between the at least one of the first branch configurations that were modified with the at least one of the additional branch configurations that have been modified;

storing, by the one or more processors, the discrepancies identified in a configuration conflict table; and automatically merging, by the one or more processors, the at least one of the first branch configurations that were implemented into the production resource into the at least one of the additional branch configuration tables when the at least one of the additional branch configurations have not been modified.

12. The method of claim 11, further comprising displaying the discrepancies to a user on a user computer system comprises:

exporting the discrepancies between the at least one of the first branch configurations that were modified and the at least one of the additional branch configurations that were modified to the configuration conflict table; and present the configuration conflict table with the discrepancies to the user for editing.

13. The method of claim 12, wherein presenting the discrepancies in the configuration conflict table comprises listing the at least one of the first branch configurations and the at least one of the additional branch configurations that do not match.

14. The method of claim 13, further comprising:

receiving, by the one or more processors, a request to edit the configuration conflict table to eliminate the at least one of the first branch configurations, the at least one of the additional branch configurations, or eliminate both the at least one of the first branch configurations and the at least one of the additional branch configurations and create at least one hybrid configuration using the at least one of the first branch configurations and the at least one of the additional branch configurations;

modifying, by the one or more processors, the configuration conflict table according to the request; and importing, by the one or more processors, at least the modifications to the configuration conflict table to the at least one of the additional branch configurations.

15. The method of claim 11, further comprising:

deploying, by the one or more processors, the first branch configurations to a first test environment within a first test resource, and wherein the first branch configurations are tested within the first test environment within the first test resource in order to determine one or more errors caused by the first branch configurations; and deploying, by the one or more processors, the additional branch configurations to the first test environment within the first test resource, and wherein the additional branch configurations are tested within the first test environment within the first test resource in order to determine the one or more errors caused by the additional branch configurations.

16. The method of claim 11, further comprising:

receiving, by the one or more processors, the one or more script patterns for the one or more resources, wherein the one or more script patterns are used to automatically create the one or more scripts for updating the one or more resource configurations for the one or more resources; and storing, by the one or more processors, the one or more script patterns;

wherein implementing the at least one of the first branch configurations that were modified to the production resource based on the one or more script patterns comprises:

accessing the one or more script patterns for the production resource;

creating the one or more scripts for the production resource; and updating the one or more resource configurations for the one or more resources based on the one or more scripts.

17. A computer program product for resource configuration migration and implementation in one or more resources utilizing multiple configuration branches, the computer program product comprising at least one non-transitory computer-readable medium having computer-readable program code portions embodied therein, the computer-readable program code portions comprising:

an executable portion configured to receive a request to create a first branch configuration table;

an executable portion configured to create the first branch configuration table with first branch configurations by duplicating main configurations from a main configuration table into the first branch configuration table;

an executable portion configured to receive a request to modify at least one of the first branch configurations in the first branch configuration table;

an executable portion configured to modify the at least one of the first branch configurations;

an executable portion configured to receive a request to create one or more additional branch configuration tables;

an executable portion configured to create the one or more additional branch configuration tables with additional branch configurations by duplicating the main configurations from the main configuration table into the one or more additional branch configuration tables;

an executable portion configured to receive a request to modify at least one of the additional branch configurations from the one or more additional branch configuration tables;

an executable portion configured to modify the at least one of the additional branch configurations from the one or more additional branch configuration tables;

an executable portion configured to implement the at least one of the first branch configurations that were modified into a production resource based on one or more script patterns for the production resource, wherein the one or more script patterns are used to automatically create one or more scripts for updating one or more resource configurations for one or more resources;

an executable portion configured to update the main configurations in the main configuration table with the at least one of the first branch configurations that were implemented into the production resource based on the one or more scripts in order to form updated main configurations in the main configuration table;

an executable portion configured to compare the at least one of the first branch configurations that were modified with the at least one of the additional branch configurations that were modified from the additional branch configurations an executable portion configured to identify discrepancies between the at least one of the first branch configurations that were modified with the at least one of the additional branch configurations that have been modified;

an executable portion configured to store the discrepancies identified in a configuration conflict table; and an executable portion configured to automatically merge the at least one of the first branch configurations that were implemented into the production resource into the at least one of the additional branch configuration tables when the at least one of the additional branch configurations have not been modified; and an executable portion configured to display discrepancies between the at least one of the first branch configurations that were modified with the at least one of the additional branch configurations that have been modified to a user on a user computer system when the discrepancies are identified.

18. The computer program product of claim 17, wherein displaying the discrepancies to a user on a user computer system comprises:

exporting the discrepancies between the at least one of the first branch configurations that were modified and the at least one of the additional branch configurations that were modified to the configuration conflict table; and present the configuration conflict table with the discrepancies to the user for editing, wherein the configuration conflict table lists the at least one of the first branch configurations and the at least one of the additional branch configurations that do not match.

19. The computer program product of claim 18, wherein the computer-readable program code portions further comprise:

an executable portion configured to receive a request to edit the configuration conflict table to eliminate the at least one of the first branch configurations, the at least one of the additional branch configurations, or eliminate both the at least one of the first branch configurations and the at least one of the additional branch configurations and create at least one hybrid configuration using the at least one of the first branch configurations and the at least one of the additional branch configurations;

an executable portion configured to modify the configuration conflict table according to the request; and an executable portion configured to import at least the modifications to the configuration conflict table to the at least one of the additional branch configurations.

\* \* \* \* \*